United States Patent [19]

Treuner

[11] 3,880,845

[45] Apr. 29, 1975

[54] THIOCARBONYLTHIOACETYL CEPHALOSPORINS

[75] Inventor: Uwe D. Treuner, Regensburg, Germany

[73] Assignee: E. R. Squibb & Sons, Inc., New York, N.Y.

[22] Filed: Mar. 11, 1971

[21] Appl. No.: 123,408

[52] U.S. Cl. .............................. 260/243 C; 424/246
[51] Int. Cl. ............................................ C07d 99/24
[58] Field of Search ............................... 260/243 C

[56] References Cited
UNITED STATES PATENTS

| | | | |
|---|---|---|---|
| 3,534,029 | 10/1970 | Beyerman ...................... | 260/243 C |
| 3,574,190 | 4/1971 | Honkanen et al. ............. | 260/239.1 |
| 3,575,969 | 4/1971 | Morin et al. .................... | 260/243 C |
| 3,579,506 | 5/1971 | Lemieux et al. ................ | 260/243 C |

Primary Examiner—Nicholas S. Rizzo
Attorney, Agent, or Firm—Lawrence S. Levinson; Merle J. Smith

[57] ABSTRACT

Thiocarbonylthioacetylcephalosporins of the general formula

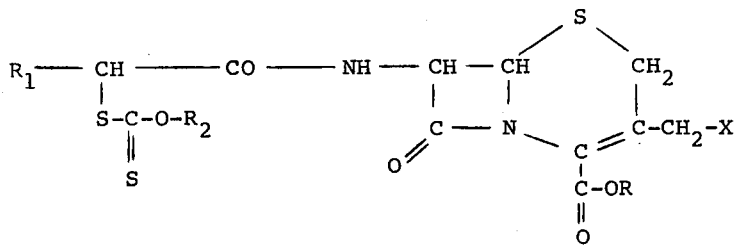

wherein R is hydrogen, lower alkyl, aralkyl, tri(lower alkyl)-silyl, a salt forming ion, or the group

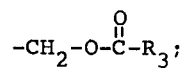

$R_1$ is hydrogen, lower alkyl, aralkyl, aryl or certain heterocyclic groups; $R_2$ is a salt forming ion, lower alkyl, aryl or aralkyl; $R_3$ is lower alkyl, aryl or aralkyl; and X is hydrogen, hydroxy, lower alkanoyloxy, aroyloxy, aralkanoyloxy, the radical of a nitrogen base, a quaternary ammonium radical, or together X and R represent a bond linking carbon and oxygen in a lactone ring; are useful as antibacterial agents.

11 Claims, No Drawings

THIOCARBONYLTHIOACETYL CEPHALOSPORINS

SUMMARY OF THE INVENTION

This invention relates to new thiocarbonylthioacetyl-cephalosporins of the formula (I)
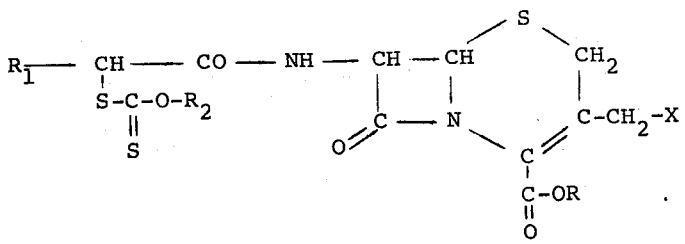

R represents hydrogen, lower alkyl, aralkyl, tri-(lower alkyl) silyl, a salt forming ion or the group

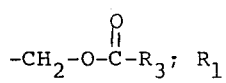

$R_1$ represents hydrogen, aryl, lower alkyl, aralkyl or certain heterocyclic groups; $R_2$ represents a salt forming ion, lower alkyl, aryl or aralkyl; $R_3$ represents lower alkyl, aryl or aralkyl. X is hydrogen, hydroxy, lower alkanoyloxy, aroyloxy, aralkanoyloxy, the radical of a nitrogen base, a quaternary ammonium radical, or together X and R represent a bond linking carbon and oxygen in a lactone ring.

The preferred members within each group are as follows: R is hydrogen, lower alkyl, alkali metal, trimethylsilyl or

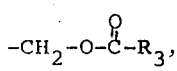

especially hydrogen, methyl, pivaloyloxy, sodium or potassium; $R_1$ is phenyl, thienyl, furyl, oxazolyl, isoxazolyl or thiazolyl, especially phenyl, $R_2$ is lower alkyl, especially methyl or ethyl; $R_3$ is lower alkyl, preferably methyl or t-butyl; and X is preferably hydrogen or acetoxy.

DETAILED DESCRIPTION OF THE INVENTION

The various groups represented by the symbols have the meanings defined below and these definitions are retained throughout this specification.

The lower alkyl groups are straight or branched chain hydrocarbon radicals having 1 to 8 carbons in the chain, for example, methyl, ethyl, propyl, isopropyl, butyl, isobutyl, t-butyl, amyl or the like.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, carboxy and the like. In the case of the last two named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl, p-hydroxyphenyl, p-carboxyphenyl and the like.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above, to form a bond linking carbon and oxygen in a lactone ring.

The heterocyclic groups represented by $R_1$ are 5- to 6-membered monocyclic heterocyclic radicals (exclusive of hydrogen), including thienyl, furyl, oxazolyl, isoxazolyl and thiazolyl, as well as these heterocyclics with the substituents halo, lower alkyl (particularly methyl and ethyl), lower alkoxy (particularly methoxy and ethoxy) or phenyl.

The salt forming ions represented by R and $R_2$ may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

The new thiocarbonylthioacetylcephalosporins of this invention are produced by reacting a 7-aminocephalosporanic acid compound of formula II [which includes 7-aminocephalosporanic acid (7-ACA), 7-amino-3-desacetoxycephalosporanic acid (7-ADCA) and other derivatives] of the formula (II)
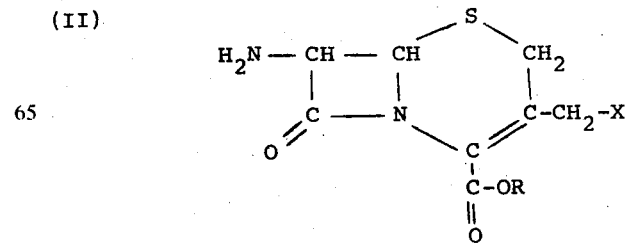

with a thiocarbonylthioacetic acid of the formula (III)

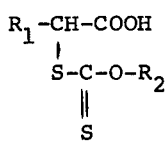

or an activated derivative of the former (II). The symbols have the meanings already defined.

The activated derivatives refered to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between 7-aminocephalosporanic acid compound and the thiocarbonylthioacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent.

When R is the acyloxymethyl group

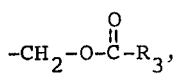

this group may be introduced into the 7-aminocephalosporanic acid moiety prior to the reaction with the thiocarbonylthioacetic acid or the activated derivative by treatment with one to two moles of a halomethyl ester of the formula (IV)

hal-CH$_2$OCOR$_3$ wherein hal is halogen, preferably chlorine or bromine, in an inert organic solvent such as dimethylformamide, acetone, dioxane, benzene or the like, at about ambient temperature or below.

As an alternative, a product of formula I may be produced by reacting a salt, e.g., an alkali metal salt, of the formula (V)

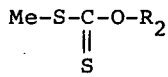

with a compound of the formula (VI)

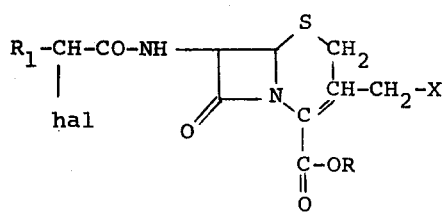

or derivative thereof. Me represents a metal, hal is halogen, preferably chlorine or bromine and R and R$_1$ are the same as above.

The thiocarbonylthioacetic acid of formula III may be produced according to the following general method.

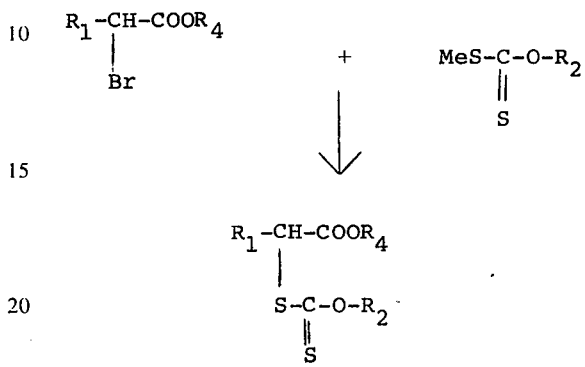

(wherein R$_4$ is hydrogen or lower alkyl) by the procedure of Bonner, Jour. Org. Chem. 33, 1831(1968).

The symbols have the meanings already defined.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used an antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1 percent by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

To 5.6 gm. (20 mmol.) of DL-[Ethoxythiocarbonyl)thio]-phenylacetic acid [produced by the method of J. Org. Chem. supra] in 50 ml. of absolute methylene chloride are added 4.12 gm. (20 mmol.) of dicyclohexylcarbodiimide in 20 ml. of methylene chloride and stirred for one half hour at 0° under nitrogen. Then 5.1 gm. of 7-aminocephalosporanic acid trimethylsilyl ester in 10 ml. of methylene chloride are added dropwise and stirred for 12 hours at 0°-5°. The reaction mixture is stirred for one more hour at room temperature. This is then filtered with suction under a nitrogen atmosphere to separate the dicyclohexyurea which has formed. The filtrate is evaporated to dryness in vacuo leaving the white amorphous product, the trimethylsilyl ester of DL-7-[2-(ethoxythiocarbonyl)thio]-2-[phenylacetamido]cephalosporanic acid, m.p. 90° (dec.).

Treatment of the ester with water gives the free acid, m.p. 50° (dec.). The beige amorphous potassium salt is obtained by treatment of the free acid with potassium ethylhexanoate solution, m.p. 145° (dec.). The sodium salt is formed similarly.

The following additional products having the formula in the right hand side of the table are obtained by the procedure of Example 1 from starting materials having the formula in the left hand part of the table (the starting materials being obtained by the method of J. Org. Chem. supra):

TABLE

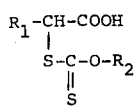   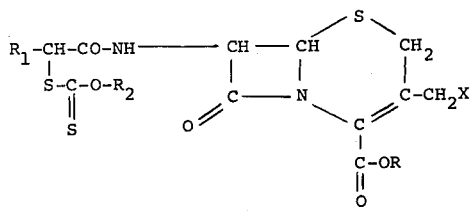

| Example | $R_1$ | $R_2$ | R | $R_1$ | $R_2$ | X |
|---|---|---|---|---|---|---|
| 2 | H | $CH_3$ | $CH_3$ | H | $CH_3$ | H |
| 3 | $CH_3$ | $C_2H_5$ | $C_2H_5$ | $CH_3$ | $C_2H_5$ | OH |
| 4 | $C_3H_7$ | $C_2H_5$ | $CH_3$ | $C_3H_7$ | $C_2H_5$ | pyridinium |
| 5 | $C_6H_5CH_2$ | $C_6H_5CH_2$ | $-CH_2O\overset{O}{\overset{\|}{C}}-CH(CH_3)_2$ | $C_6H_5CH_2$ | $C_6H_5CH_2$ | $OCOCH_3$ |
| 6 | $4\text{-}ClC_6H_4$ | H | $-CH_2O\overset{O}{\overset{\|}{C}}-C_6H_5$ | $4\text{-}ClC_6H_4$ | H | $OCOCH_3$ |
| 7 | $3,4\text{-}(CH_3O)_2C_6H_3$ | $C_2H_5$ | $C_2H_5$ | $3,4\text{-}(CH_3O)_2C_6H_3$ | $C_2H_5$ | H |
| 8 | $3,4,5\text{-}(CH_3O)_3C_6H_2$ | $C_2H_5$ | $C_2H_5$ | $3,4,5\text{-}(CH_3O)_3C_6H_2$ | $C_2H_5$ | $OCOCH_3$ |
| 9 | $4\text{-}CH_3C_6H_4$ | Na | Na | $4\text{-}CH_3C_6H_4$ | Na | $OCOCH_3$ |
| 10 | $3,4\text{-}(Br)_2C_6H_3CH_2$ | H | lactone (+X) | $3,4\text{-}(Br)_2C_6H_3CH_2$ | H | lactone (+R) |
| 11 | $2,4\text{-}(Cl)_2C_6H_3$ | $C_2H_5$ | $C_2H_5$ | $2,4\text{-}(Cl)_2C_6H_3$ | $C_2H_5$ | $OCOCH_3$ |
| 12 | 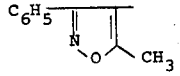 | $C_2H_5$ | $C_2H_5$ | 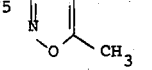 | $C_2H_5$ | $OCOCH_3$ |
| 13 |  | $C_2H_5$ | $C_2H_5$ |  | $C_2H_5$ | $OCOCH_3$ |
| 14 |  | $C_6H_5CH_2$ | $C_6H_5CH_2$ |  | $C_6H_5CH_2$ | $OOCH_2C_6H_5$ |
| 15 | $C_6H_5$ | $C_6H_5$ | $CH_2O\overset{O}{\overset{\|}{C}}-C(CH_3)_3$ | $C_6H_5$ | $C_6H_5$ | H |
| 16 | $C_6H_5$ | $C_6H_5$ | $CH_2O\overset{O}{\overset{\|}{C}}-C(CH_3)_3$ | $C_6H_5$ | $C_6H_5$ | $OOC\text{-}C_6H_5$ |
| 17 | $C_6H_5$ | $C_2H_5$ | H | $C_6H_5$ | $C_2H_5$ | H |

TABLE – Continued

| Example | $R_1$ | $R_2$ | R | $R_1$ | $R_2$ | X |
|---|---|---|---|---|---|---|
| 18 | $C_6H_5$ | $C_2H_5$ | Na | $C_6H_5$ | $C_2H_5$ | H |
| 19 | $C_6H_5$ | $C_2H_5$ | $CH_2O-\overset{O}{\underset{\|}{C}}-C(CH_3)_3$ | $C_6H_5$ | $C_2H_5$ | $OCOCH_3$ |
| 20 | $C_6H_5$ | $N(C_2H_5)_3$ | $N(C_2H_5)_3$ | $C_6H_5$ | $N(C_2H_5)_3$ | H |
| 21 | $C_6H_5$ | Na | Na | $C_6H_5$ | Na | H |
| 22 | $C_6H_5$ | Na | Na | $C_6H_5$ | Na | $OCOCH_3$ |

What is claimed is:

1. A compound of the formula

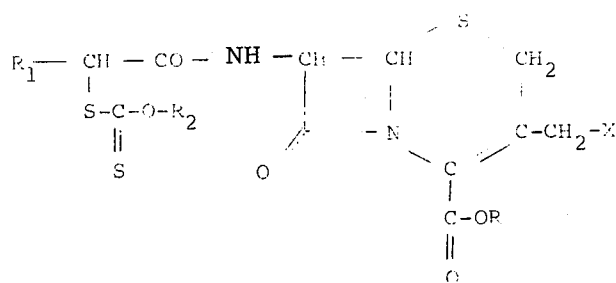

wherein R is hydrogen, lower alkyl, $R_4$-phenyllower alkyl, tri(lower alkyl)silyl,

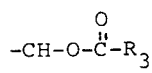

or a salt forming ion of the group consisting of aluminum, alkali metal, alkaline earth metal, dibenzylamine, N,N-dibenzylethylenediamine, methylamine, triethylamine, procaine and N-ethylpiperidine, $R_1$ is hydrogen, lower alkyl, $R_4$-phenyl-lower alkyl, $R_4$-phenyl, or a monocyclic heterocyclic selected from the group consisting of thienyl, furyl, oxazolyl, isoxazolyl and thiazolyl, and halo, lower alkyl, lower alkoxy or phenyl substituted members of said heterocyclics, $R_2$ is a salt forming metal of the group consisting of aluminum, alkali metal or alkaline earth metal, lower alkyl, $R_4$-phenyl, $R_4$-phenyl-lower alkyl, $R_3$ is lower alkyl, $R_4$-phenyl, $R_4$-phenyl-lower alkyl, and X is hydrogen, hydroxy, lower alkanoyloxy, $R_4$—phenyl—CO—O, $R_4$-phenyl-lower alkanoyloxy, lower alkylamine, dibenzylamine, N,N'-dibenzylpyridinium, pyridinium, 1-quinolinium, 1-picolinium or together X and R represent a bond linking carbon and oxygen in a lactone ring, and $R_4$ is hydrogen, halogen, lower alkyl, lower alkoxy, hydroxy or carboxy.

2. A compound as in claim 1 wherein $R_1$ is phenyl.

3. A compound as in claim 2 wherein R and $R_2$ each is lower alkyl.

4. A compound as in claim 2 wherein R and $R_2$ each is alkali metal ion.

5. A compound as in claim 2 wherein R is hydrogen and $R_2$ is lower alkyl.

6. A compound as in claim 1 wherein R is potassium, $R_1$ is phenyl, $R_2$ is ethyl and X is hydrogen.

7. The alkali metal salt of the compound of claim 1 wherein $R_1$ is phenyl and X is hydrogen.

8. A compound as in claim 1 wherein R is potassium, $R_1$ is phenyl, $R_2$ is ethyl and X is acetoxy.

9. A compound as in claim 2 wherein R is alkali metal, $R_2$ is lower alkyl and X is lower alkanoyloxy.

10. A compound as in claim 2 wherein R is alkali metal, $R_2$ is lower alkyl and X is hydrogen.

11. A compound as in claim 1 wherein R is hydrogen, lower alkyl, alkali metal, trimethylsilyl or $$-CH_2O\overset{O}{\underset{\|}{C}}-R_3,$$

$R_1$ is phenyl, thienyl, furyl, oxazolyl, isoxazolyl or thiazolyl; $R_2$ and $R_3$ each is lower alkyl, and X is hydrogen or acetoxy.

* * * * *